United States Patent

Itoh et al.

[11] Patent Number: 6,036,088
[45] Date of Patent: *Mar. 14, 2000

[54] METHOD AND APPARATUS FOR PROCESSING IC CARD FOUND

[75] Inventors: Shigeyuki Itoh, Kawasaki; Kenji Matsumoto, Yokohama, both of Japan

[73] Assignee: Hitachi, Ltd, Tokyo, Japan

[*] Notice: This patent is subject to a terminal disclaimer.

[21] Appl. No.: 08/913,252

[22] PCT Filed: Mar. 15, 1995

[86] PCT No.: PCT/JP95/00430

§ 371 Date: Sep. 10, 1997

§ 102(e) Date: Sep. 10, 1997

[87] PCT Pub. No.: WO96/28792

PCT Pub. Date: Sep. 19, 1996

[51] Int. Cl.[7] .................................................. G06F 17/00
[52] U.S. Cl. ........................... 235/375; 235/380; 235/379
[58] Field of Search .................................... 235/375, 379, 235/380, 381, 382, 451, 492; 902/4, 5, 26

[56] References Cited

U.S. PATENT DOCUMENTS

| | | | |
|---|---|---|---|
| 4,271,352 | 6/1981 | Thomas | 235/375 |
| 4,839,504 | 6/1989 | Nakano | 235/379 |
| 4,968,873 | 11/1990 | Dethloff et al. | 235/380 |
| 5,204,663 | 4/1993 | Lee | 340/825.34 |
| 5,434,395 | 7/1995 | Storck et al. | 235/380 |
| 5,594,233 | 1/1997 | Kenneth et al. | 235/492 |
| 5,761,309 | 6/1998 | Ohashi et al. | 380/25 |
| 5,932,859 | 8/1999 | Ijichi et al. | 235/380 |

FOREIGN PATENT DOCUMENTS 5-504643  7/1993  Japan .

OTHER PUBLICATIONS

K.K. Denki Shoin (Jul. 1989) JP.

Primary Examiner—Michael G Lee
Attorney, Agent, or Firm—Antonelli, Terry, Stout & Kraus, LLP

[57] ABSTRACT

An IC card system which includes an IC terminal and a remote IC card found processing center operatively connected to the IC terminal by way of a telephone line for processing a lost and found IC card. The IC terminal includes a first card insertion slot which receives insertion of a lost and found IC card; a second card insertion slot which receives insertion of a second IC card to receive reward data from the IC card processing center; a key input unit which permits the user to initiate processing of the lost found IC card; a display unit which provides a visual display of processing conditions of the lost and found IC card; and a processor which reads information from the lost and found IC card and records reward data for the processing of the lost and found IC card from the remote IC card processing center into the second IC card. The remote IC card processing center includes a first memory which stores information of the lost and found IC card transmitted from the IC terminal; a second memory which stores reward data; and a processing unit which transmits data indicating reception of the processing request of the lost and found IC card on the basis of a calling signal from the IC terminal, generates an instruction to invalidate operations of the lost and found IC card after storage of the information of the lost and found IC card, and transmits the reward data and the operation invalidating instruction to the IC terminal. This way lost IC card may be effectively returned to the rightly owner, and the finder of the lost IC card may be rewarded conveniently.

19 Claims, 9 Drawing Sheets

AN EXAMPLE OF OPERATIONAL FLOW CHART OF PUBLIC TELEPHONE TO COPE WITH IC CARD FOUND PROCESSING

AN EXAMPLE OF OPERATIONAL FLOW CHART OF PUBLIC TELEPHONE TO COPE WITH IC CARD FOUND PROCESSING

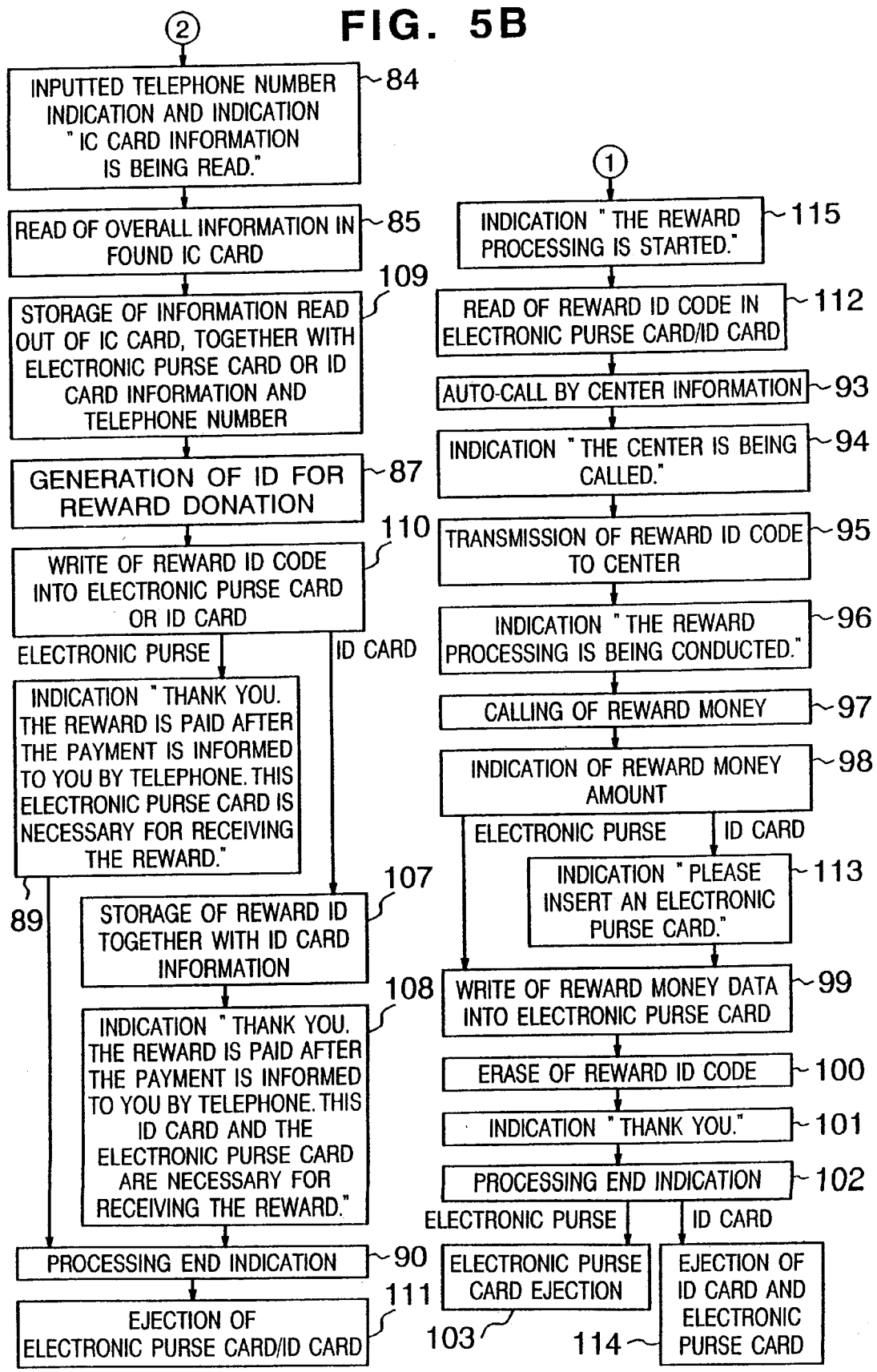

6,036,088

METHOD AND APPARATUS FOR PROCESSING IC CARD FOUND

TECHNICAL FIELD

The present invention relates to a processing system for use when a lost IC card is found and more particularly, relates to IC card found processing method and apparatus for performing efficient data processing by using a communication line and an electronic purse.

BACKGROUND ART

At present, a card using magnetic stripes is mainly used as a credit card or a cash card of a bank. The card using magnetic stripes, however, faces a serious problem from the standpoint of security against, for example, an unauthorized use. As a card for solving this problem, an IC card carrying an IC chip as described in IC card published by Kabushiki-kaisha Denki Shoin (July, 1989) is known. Also, as an example of a system utilizing an IC card and for use with electronic money, an electronic purse system is described in JP-A-5-504643.

By utilizing the IC card, security can be improved greatly against unauthorized uses such as duplication of card and data alteration. Accordingly, restraint unauthorized uses such as robbery of IC card, duplication of card and data alteration can be expected. On the other hand, it is conceivable that personal information specific to an IC card owner utilizing features of the IC card such as ability to rewrite data, high security and ability to store a large amount of data—for example, the frequency in shopping, the utilization point number and the personal clothing size information—is stored in the IC card. Accordingly, while the main procedure in the past is to stop (invalidate) the card function in the event that a card is lost, it is necessary in future to recover the personal information stored in the IC card in addition to the stoppage (invalidation) of the card function. How to recover a missing card when the IC card is lost is of importance. Especially, in a system utilizing cash having anonymity in electronic purses by storing the cash in an IC card, the effective recovery in the event of loss of the IC card leads to an important problem of the recovery of cash information.

SUMMARY OF INVENTION

An object of the present invention is to provide an IC card recovery processing method and apparatus which can easily recover the information stored in the found IC card without any burden to a finder, an original IC card owner and a card issuing party and can return the information to the owner.

Another object is to provide IC card found processing method and apparatus which can reward by electronic money to an IC card finder by utilizing a communication line in order to improve the recovery rate of the IC card. Further, by improving the recovery rate, security of the IC card can be maintained at a higher level and the cost of security maintenance in an IC card system can be reduced.

According to the present invention, an apparatus for processing an IC card found in an IC card system having an IC card incorporating a microprocessor or a memory, means for reading/writing information stored in the IC card and communication means for transmitting/receiving the information by using a public telephone line, comprises a terminal device and an IC card found processing center.

The terminal device includes: a first insertion slot to which a found IC card is inserted; a second insertion slot to which a second IC card is inserted; a button dedicated to starting the recovery processing for transmission of information of the found IC card to the IC card found processing center; means for calling the IC card found processing center on the basis of the information read out of the inserted found IC card after the dedicated button is depressed; display means for displaying found processing conditions; means for reading information from the second IC card and transmitting the information to the IC card found processing center; means for writing a processing code for the recovery processing generated by the IC card found processing center into the second IC card; means for erasing the information in the found IC card by an instruction from the IC card found processing center; and means for storing the erased found IC card.

The IC card found processing center includes: means for storing at least the information of the found IC card on the basis of a transmission signal from the terminal unit; means for generating a processing code for the recovery processing; means for generating an instruction for erase of the information in the found IC card; and means for storing the information of the second IC card transmitted from the terminal device and the processing code.

The present invention can easily recover the information stored in the found IC card without any burden to a card finder, an original IC card owner and a card issuing party, and can return the information to the rightful owner. Further, the present invention can reward suitably and easily by electronic money to the finder of the lost IC card by utilizing a communication line while preventing unauthorized practice.

BRIEF DESCRIPTION OF DRAWINGS

FIGS. 5A and 5B are examples of an operational flow chart of the public telephone 1 and the remote IC card found processing center 7 for processing a lost and found IC card shown in FIGS. 4A and 4B.

BEST MODE FOR CARRYING OUT THE INVENTION

An embodiment of the present invention will be described hereunder with reference to the drawings.

Figure 1:
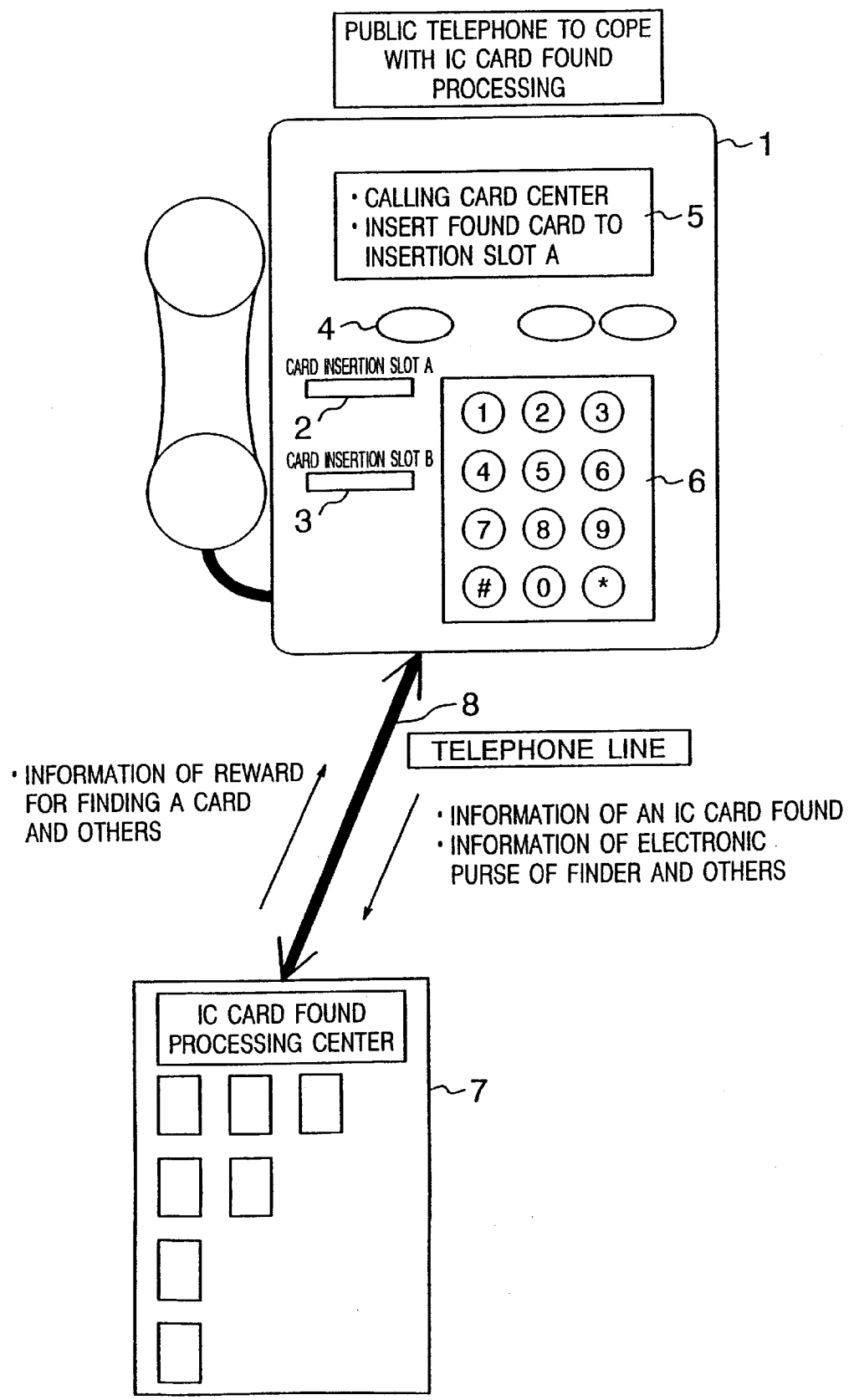
FIG. 1 is an example of an IC card system including a public telephone 1 and a remote IC card found processing center 7 for processing a lost and found IC card according to the principles of the present invention.
Figure 2A:
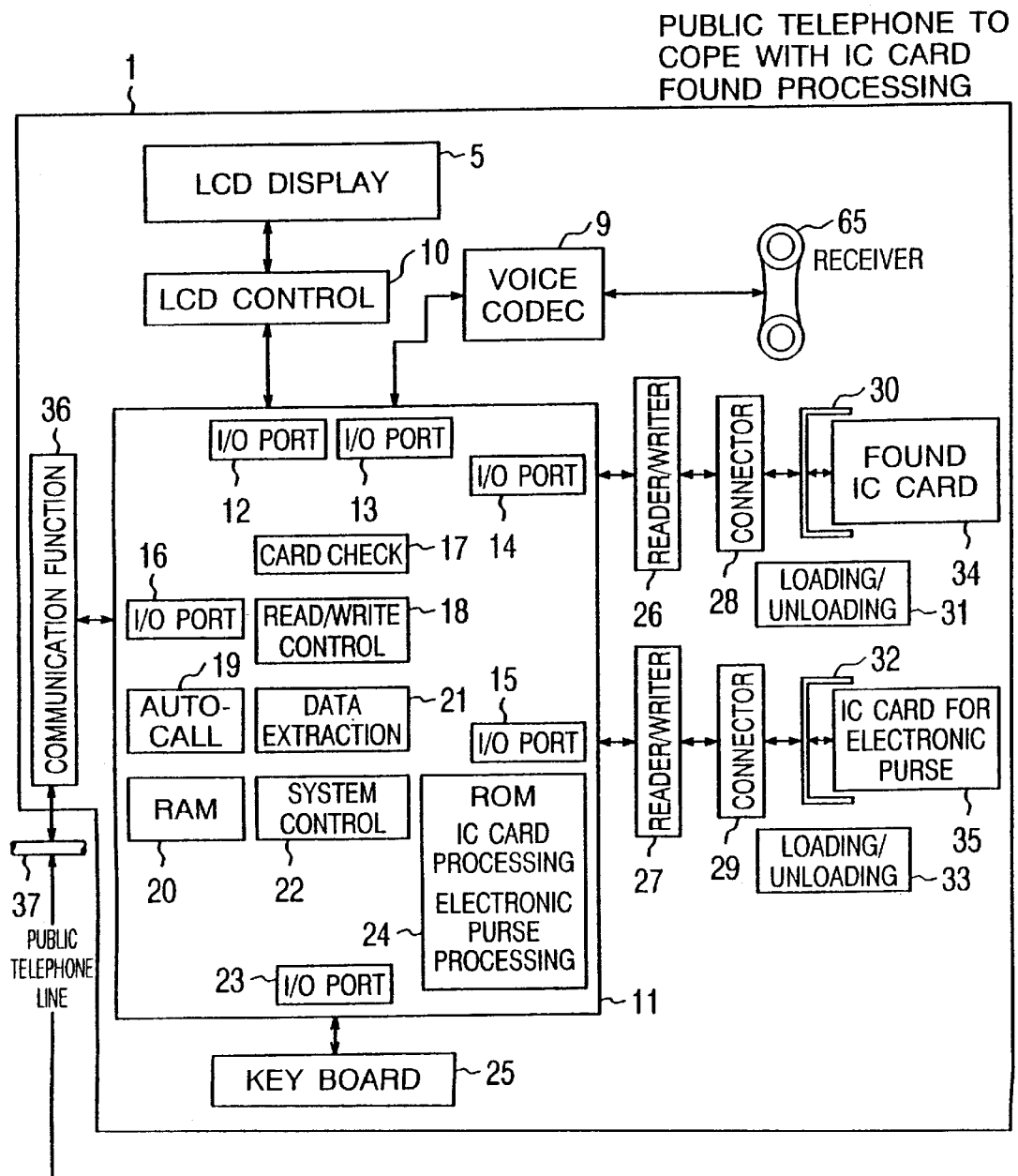
FIGS. 2A and 2B are examples of block diagrams of the public telephone 1 and the remote IC card found processing center 7 according to a preferred embodiment of the present invention.
Figure 2B:
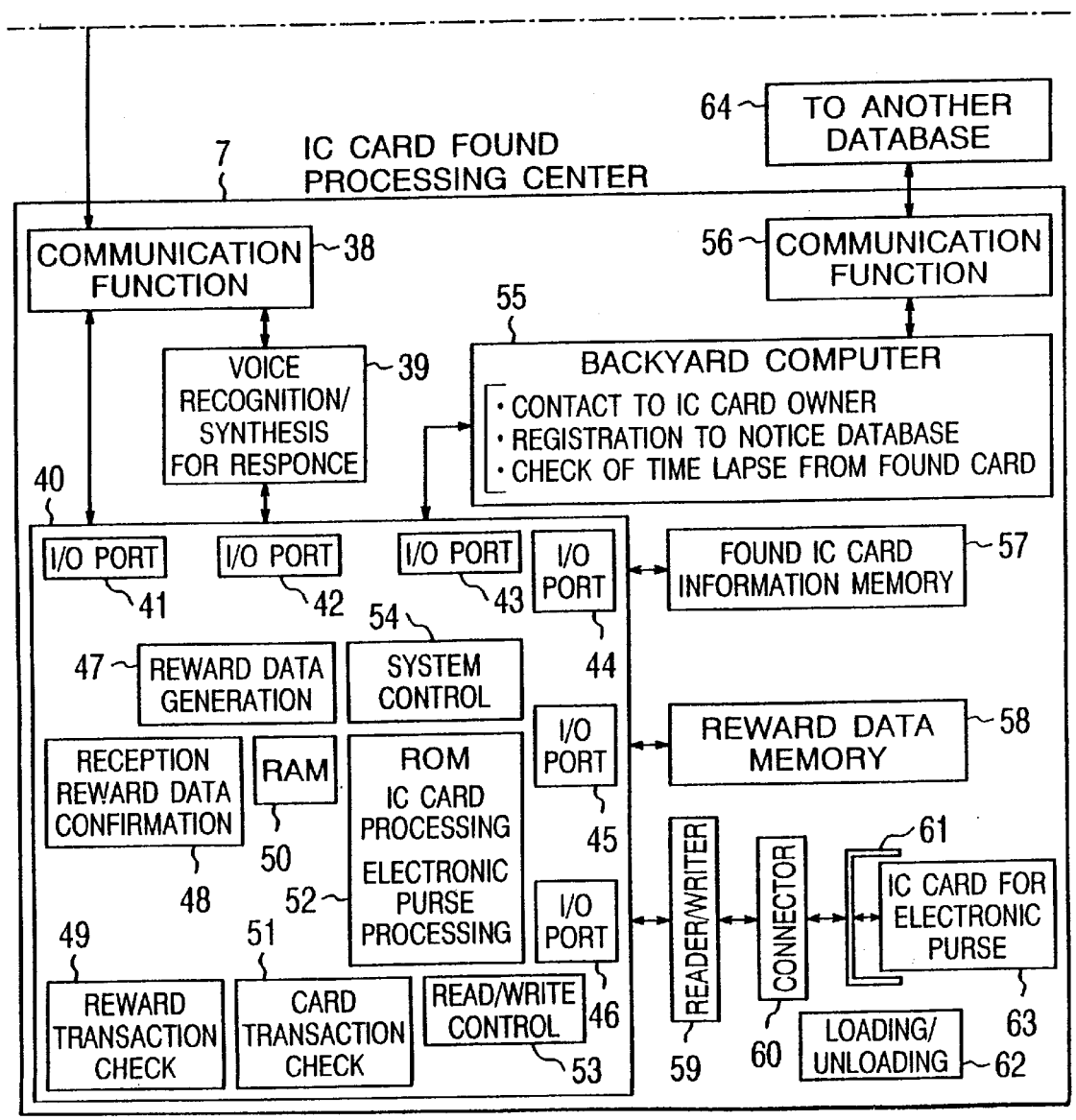
Figure 3A:
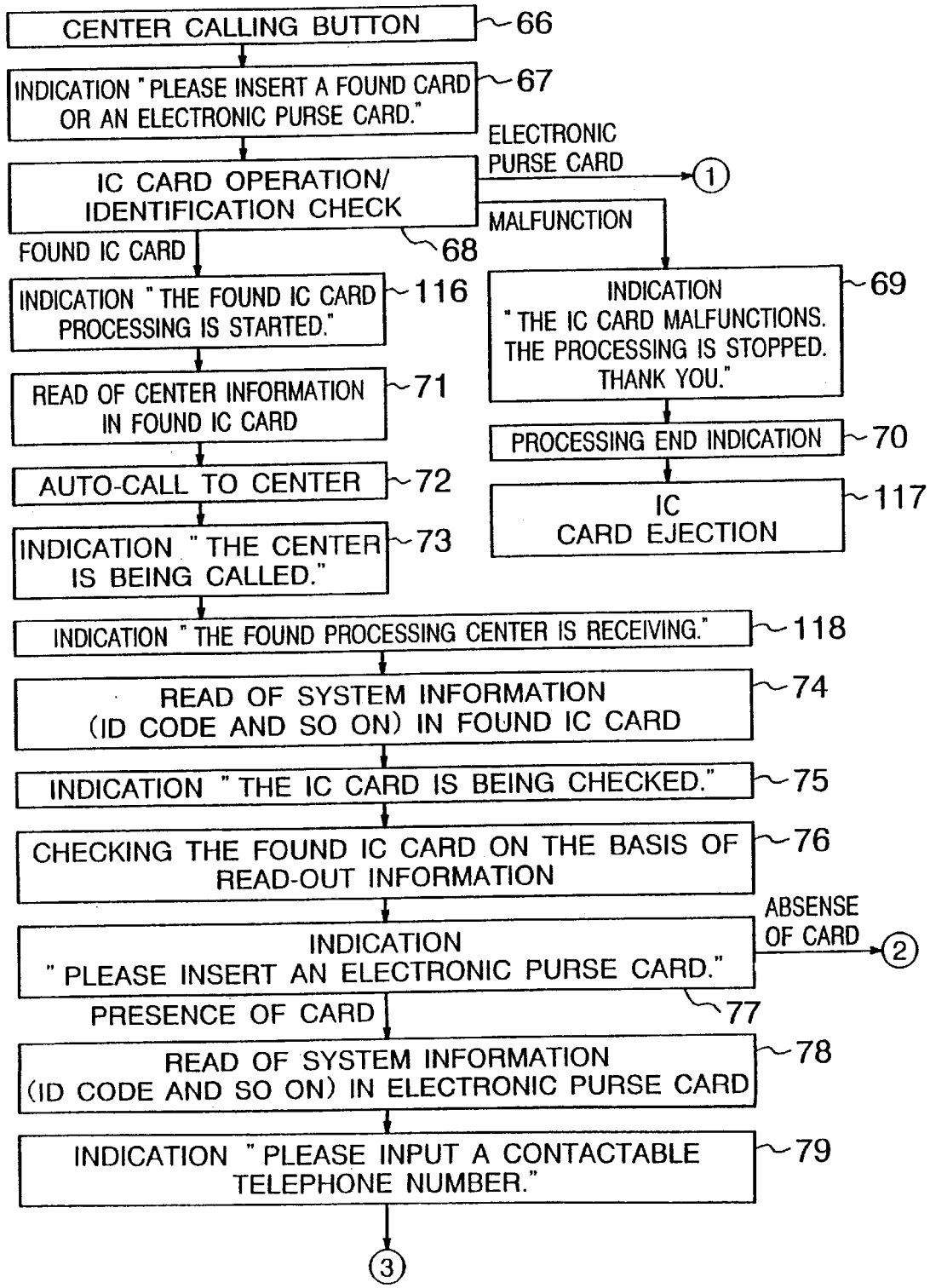
FIGS. 3A and 3B are examples of an operational flow chart of the public telephone 1 and the remote IC card found processing center 7 for processing a lost and found IC card shown in FIGS. 2A and 2B.
Figure 3B:
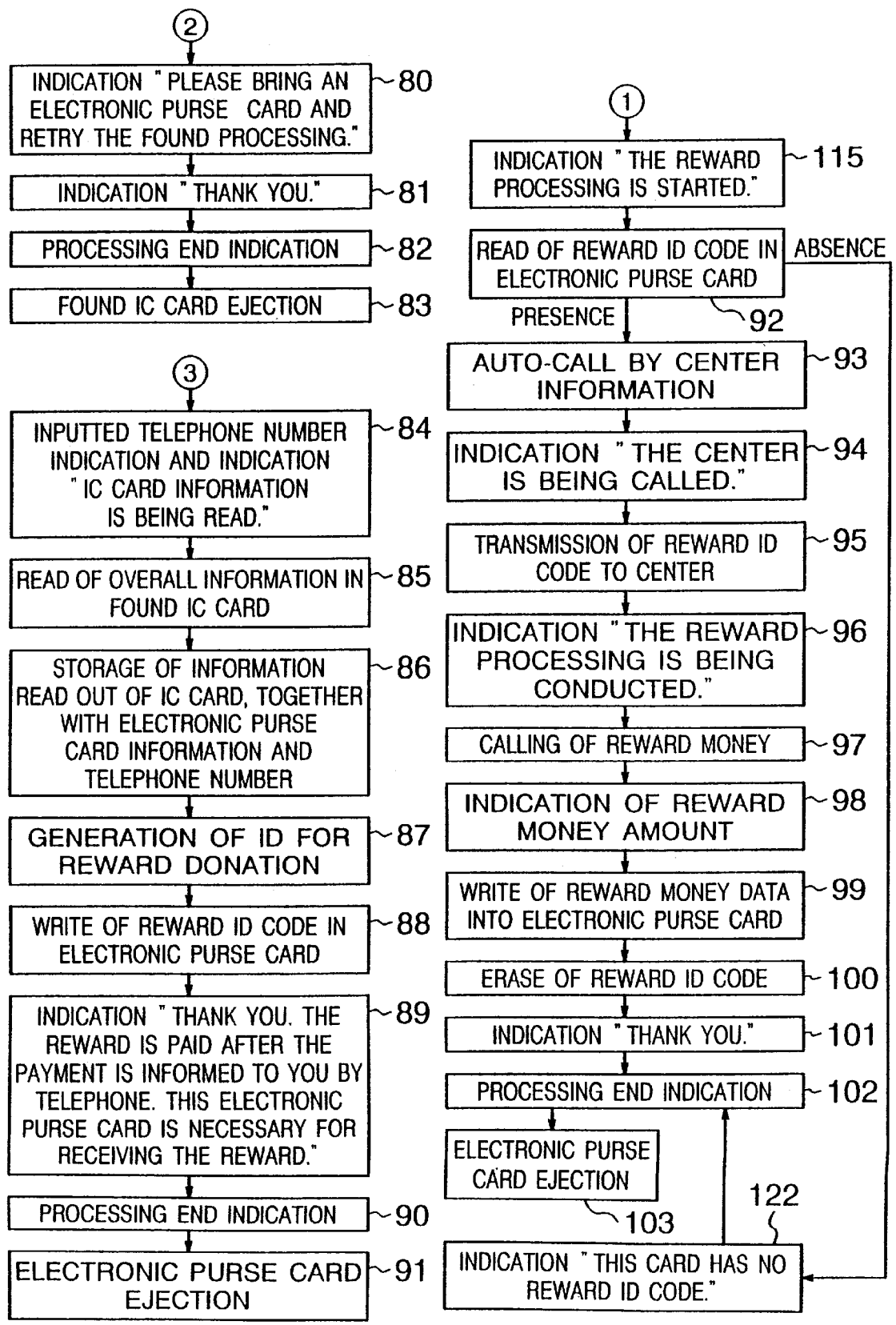
Figure 4A:
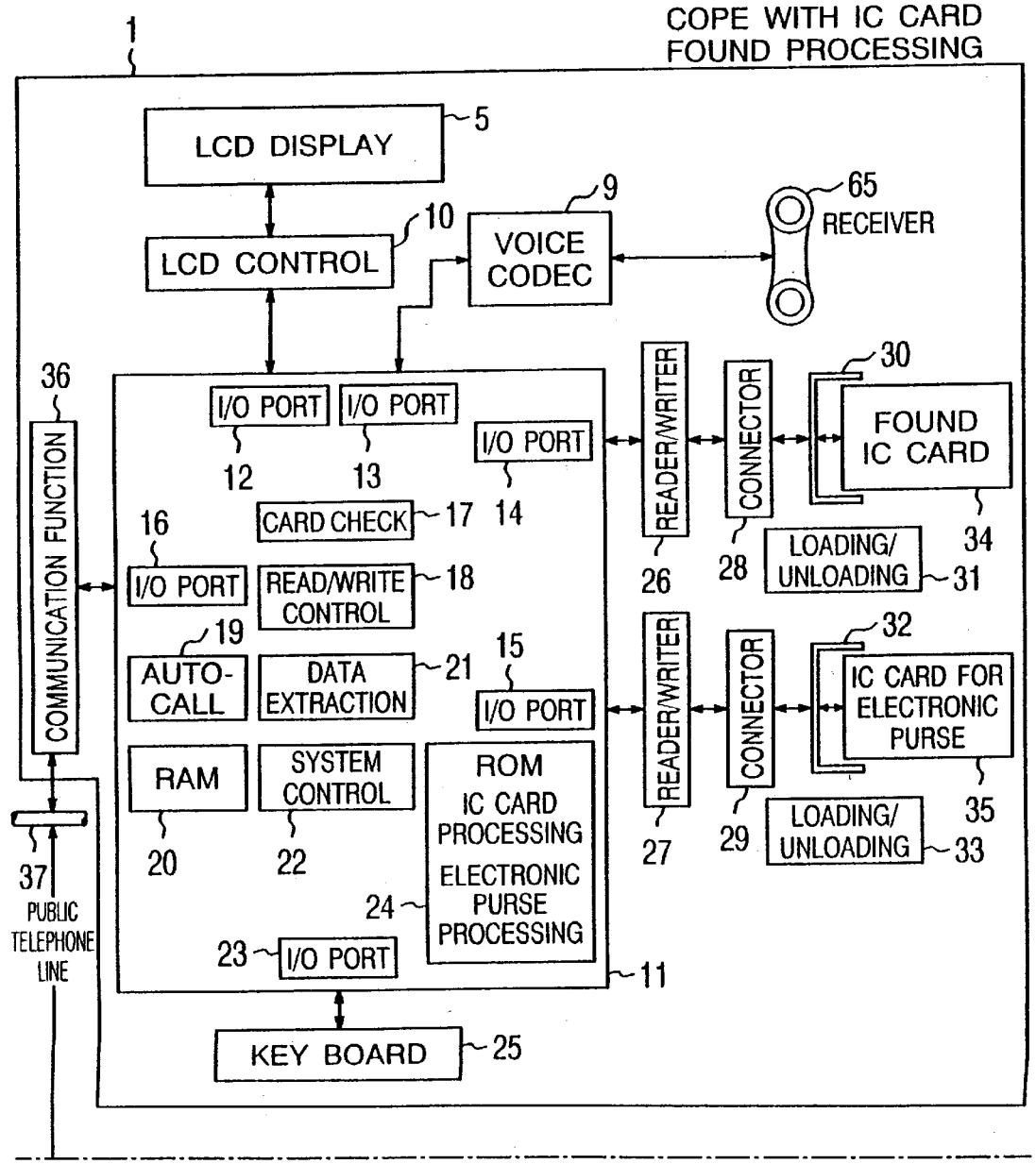
FIGS. 4A and 4B are examples of block diagrams of the public telephone 1 and the remote IC card found processing center 7 according to another preferred embodiment of the present invention.
Figure 4B:
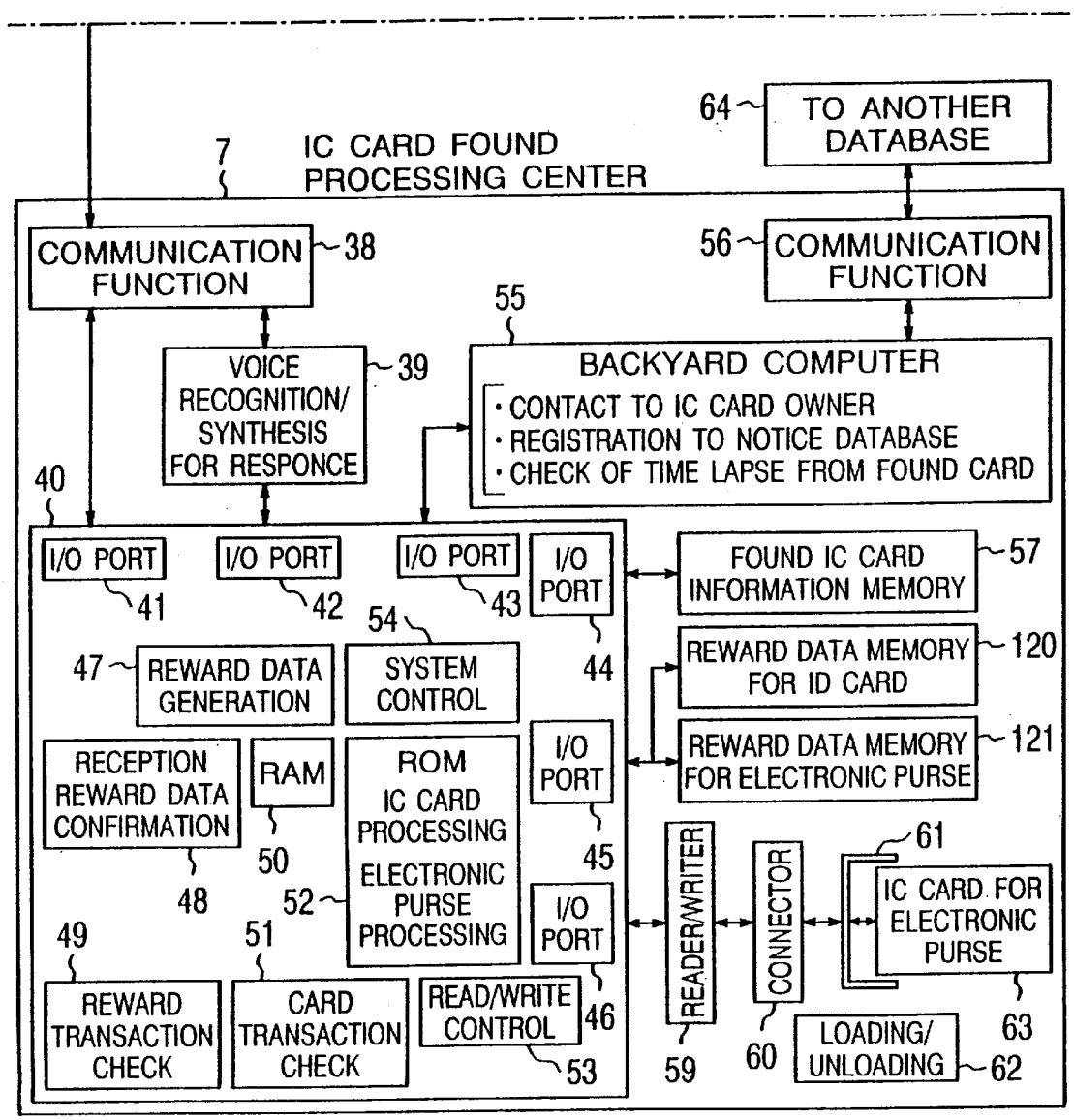
Figure 5A:
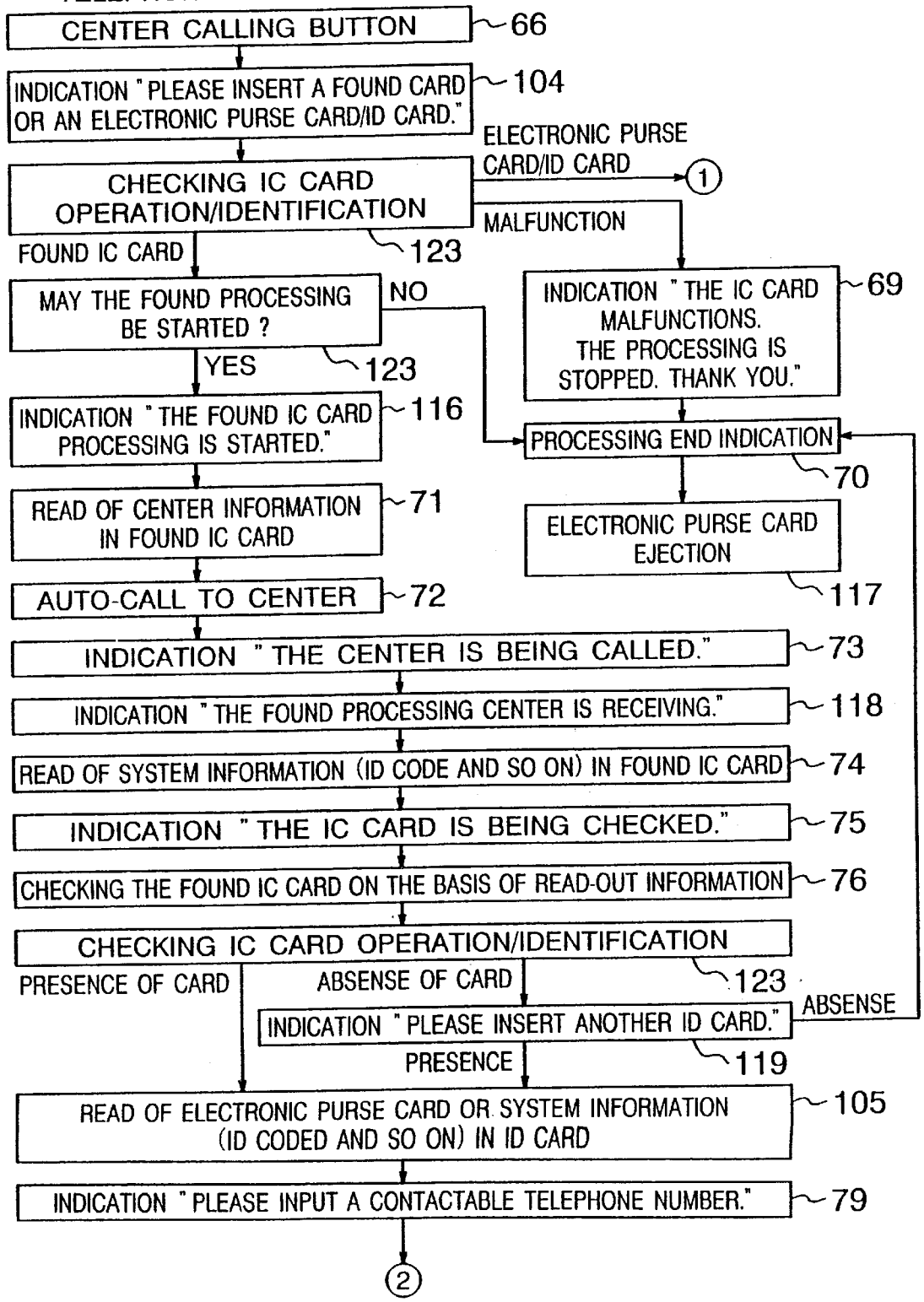

FIG. 1 is an example of a public telephone to cope with IC card found processing to which the present invention is applied, FIGS. 2A and 2B provide an example of a block diagram illustrating the construction of the public telephone to cope with IC card found processing shown in FIG. 1, and FIGS. 3A and 3B provide an example of an operational flow chart.

In FIG. 1, 1 designates a main body of the public telephone to cope with IC card found processing, 2 and 3 designate IC card insertion slots, 4 designates a function button for calling an IC card found processing center, 5 designates a display, 6 designates numerical keys, 7 designates the IC card found processing center, and 8 designates a public telephone line.

The processing to be carried out when an IC card is found will be described with reference to FIGS. 1, 2A–2B and 3A–3B.

In order to start the processing of the found IC card, the IC card found processing center calling button 4 is depressed at the public telephone 1 to cope with IC card found processing of FIG. 1. To describe a concrete operation, in the example of block construction of the public telephone 1 to cope with IC card found processing shown in FIGS. 2A and 2B, an IC card found processing center calling button signal is inputted from a keyboard 25 via an I/O port 23 and the public telephone 1 to cope with IC card found processing is switched into a found IC card processing mode by a system control circuit 22 and on the basis of data in a RAM (Random Access Memory) 20 and a ROM (Read Only Memory) 24 in a processing circuit block 11 (step 66). At the same time, an I/O port 12 and a LCD control circuit 10 are controlled to display an indication "Please insert a found IC card or an electronic purse card" on a LCD display 5 (step 67). Although not described especially, the indication on the display 5 is also announced in the form of a voice through the medium of a receiver 65.

In accordance with this instruction, a found IC card 34 is inserted in the card insertion slot A2 of FIG. 1. In the public telephone 1 to cope with IC card found processing, when an IC card loading/unloading circuit 31 and an actuation mechanism 30 confirm that the card is inserted, an ATR (Answer To Reset) operation is carried out through an IC card connector 28, a reader/writer circuit 26 and an I/O port 14 in order to check whether the inserted card is an electronic purse card and this operation is confirmed by a card check circuit 17. Also, identification of the IC card is determined on the basis of ATR information (step 68).

When the card check circuit 17 confirms a complete inoperativeness such as no response to the ATR by the inserted IC card, an indication "This IC card malfunctions. The processing is stopped. Thank you" is displayed on the display 5 for a predetermined time (step 69). At the end of the predetermined time, the indication is switched to an indication "The processing ends" (step 70) and at the same time, the inserted IC card is ejected by means of the IC card loading/unloading circuit 31 and actuation mechanism 30 (step 117).

After the operation of the inserted IC card is confirmed, identification Of the inserted IC card is determined on the basis of the read-out ATR information and IC card identifying information in the ROM 24 (step 68).

When the result indicates that the inserted IC card is not an electronic purse card, an indication "The processing of the found IC card is started" is displayed on the display 5 (step 116). At the same time, information stored in the ATR and concerning a processing center to which the found IC card belongs is read by a data extraction circuit 21 (step 71) and communication with the IC card found processing center is automatically carried out (auto-dialed) on the basis of the information through a communication function circuit 36 and the public telephone line by means of an auto-call circuit 19 (step 72). Upon completion of the auto-call, an indication "The center is being called" is displayed on the display 5.

On the other hand, in the IC card found processing center 7, when the calling signal sent to the center 7 via the public telephone line is received through a communication function circuit 38 and an I/O port 41, the IC card found processing center 7 is switched into the found IC processing mode by a system control circuit 54 and on the basis of data in a RAM (Random Access Memory) 50 and a ROM 52 in a processing circuit block 40 and returns information "The found processing is being received" to the originator or the public telephone 1 to cope with IC card found processing. Although not described especially, a voice recognition/synthesis circuit 39 for response transmits to the public telephone I to cope with IC card found processing a voice output for response in voice together with the return signal.

In the public telephone 1 to cope with IC card found processing, an indication "The found processing center is receiving" is displayed on the display 5 on the basis of the return signal (step 118). A response in the form of a voice is also made by means of an I/O port 13, a voice codec circuit 9 and the receiver 65.

Further, following the return signal, the center 7 first transmits an instruction for reading information specific to a system of the found IC card such as an ID code, an issue place, an issue date and an issue version.

Responsive to the instruction, in the public telephone 1 to cope with IC card found processing, a read/write control circuit 18 in the processing circuit block 11 reads the information specific to the system from the inserted found IC card 34 through the IC card connector 28, reader/writer circuit 26 and I/O port 14. The read-out information is transmitted to the IC card found processing center 7 through the communication function circuit 36, public telephone line 37 and communication function circuit 38 without being stored in the public telephone 1 to cope with IC card found processing (step 74).

In the IC card found processing center 7, another computer (backyard computer 55) checks the read-out information and another database 64 in which data on, for example, lost cards is stored by using a communication function 56. The result is compared with the system specific information read out of the found IC card by means of a card transaction check 51 (step 76). In addition, apart from the above found processing, the backyard computer 55 utilizes the communication function 56 and the different database 64 to access a database (wanted database) on which searching of missing IC cards is noticed so as to check whether the found IC card is involved or so as to identify a rightful owner on the basis of the read-out IC card specific information. The thus identified IC card owner is informed that the IC card is found.

Concurrently with the checking, "The IC card is being checked" is returned to the public telephone 1 to cope with IC card found processing. In the public telephone I to cope with IC card found processing, an indication "The IC card is being checked" is displayed on the display 5 in response to the return signal (step 75).

Further, several access operations are carried out by an instruction based on data in the ROM 52 of the processing circuit block 40 in the center 7 to check security against an unauthorized duplication of the found IC card 34 and data alteration and the output result is transmitted to the center 7. Analysis of security check data is time-consuming and is therefore separated from the found processing so as to be conducted by the backyard computer 55. The result of the security check is added to information of the found IC card to be described later and stored.

Upon completion of the IC card checking, the center 7 instructs the public telephone 1 to cope with IC card found processing to prepare for insertion of an electronic purse card in order to reward the finder for the found IC card processing. On the basis of this instruction, in the public telephone 1 to cope with IC card found processing, an indication "Please insert an electronic purse card" is displayed on the display 5 and at the same time, the public telephone 1 to cope with IC card found processing is switched into an electronic purse card receiving mode (step 77). In this phase, with an IC card inserted, it is check whether the card is one having an electronic purse function (step 77) and when the card has no electronic purse function or when any card is not inserted during a predetermined time, an indication "Please bring an electronic purse card and retry the found processing." is displayed on the display 5 (step 80). Subsequently, an indication "Thank you" is displayed (step 81), an indication "The processing ends" is displayed (step 82) and then the inserted found IC card is ejected from the card insertion slot (step 83). Further, information that the found IC card processing is canceled on the way because no electronic purse card for the found IC card processing is inserted is transmitted to the center 7.

Receiving this signal, the center 7 adds the information to the effect that the found IC card processing ends on the way to the system specific information read out of the found IC card and the transaction check result of the found IC card and stores the resulting information in a found IC card memory 57 via an I/O port 44 in the center 7 (step 83).

On the other hand, in the case of a card having an electronic purse function, the system specific information such as an ID code, an issue place, an issue date, and an issue version is read out of the inserted electronic purse card (step 78). The system specific information read out of the electronic purse card is transmitted to the center 7 without being stored in the public telephone 1 to cope with IC card found processing. When receiving the electronic purse card specific information, the center 7 sends an instruction for asking the receiver to inform a reward receivable date and to input a telephone number necessary for identifying the person in question and for reading the overall user information in the found IC card. Receiving this instruction, the public telephone 1 to cope with IC card found processing displays an indication "Please input a contactable telephone number" on the display 5 and waits for inputting of the contactable telephone number (step 79). Then, with the contactable telephone number inputted, the inputted telephone number is displayed on the display 5 (step 84) and the overall user information in the found IC card is read (step 85).

The overall user information read out of the found IC card is transmitted to the center 7 without being stored in the public telephone 1 to cope with IC card found processing. In the center 7, the overall user information in the found IC card is stored in the found IC card information memory 57 together with the electronic purse specific information and the contactable telephone number information (step 86).

At the same time, a reward transaction check circuit 49 in the center 7 checks a reward payment transaction till then which is also stored in a reward data memory 58 and the electronic purse specific information presently transmitted to check whether the reward interval is abnormally short, in order to prevent an unauthorized practice aiming at acquisition of reward money.

If no abnormality is found in the check of the reward transaction, an ID code necessary for donating reward money to the IC card found processing is generated by a reward data generating circuit 47 (step 87).

Thus, the generated reward ID code is transmitted to the public telephone 1 to cope with IC card found processing and is written in a user area of the inserted electronic purse card 35 by means of the read/write control circuit 18 and reader/writer 27 (step 88). The reward ID code consists of the date, the found processing center code, the center telephone number, the reward processing ID number, the kind of the found processing IC card and the number of a public telephone which has received the found processing.

The reasons why reward money for the found processing is not paid immediately but the reward ID code is written in the electronic purse card are:

1. In order to prevent an unfair practice aiming at acquisition of reward money,
    A) the finder himself or herself is checked,
    B) reward money is donated to the finder after an owner of the found card is found, and
    C) when no owner is found, the reward money is donated by the found center after a predetermined time (for example, a year or half) has elapsed.
2. Since the found IC card is assumed to include various kinds of cards such as (a) a driver's license, (b) a health insurance card, (c) an electronic purse card and (d) a credit card and the owner has different degrees of necessities for recovering data, the reward for finding is determined at discretion of the owner.

When the writing of the reward ID code ends, an indication "Thank you. The found IC card is a . . . card (for example, an electronic purse card). A reward for finding will be informed to you by telephone after the owner is found. For reception of the reward, this electronic purse card is necessary" is displayed on the display 5 on the basis of information and instruction from the center 7 (step 89). At the end of a predetermined time, an indication "Please receive the electronic purse card. The found processing ends" is displayed (step 90) and the inserted electronic purse card is ejected (step 91).

On the other hand, the found IC card is erased of the overall user information, dealt with such that the operation of the IC card is not permitted and recovered in the public telephone 1 to cope with IC card found processing.

Incidentally, when abnormality is recognized in the reward transaction check, an indication "The found processing is suspended. Please contact a processing suspend center (telephone number xxx-yyyy)" is displayed and the processing ends after ejecting the electronic purse card. Further, the information of the read-out found IC card is added with the information specific to the electronic purse card of which the abnormality is recognized, a flag indicative of the abnormality of reward transaction, the found processing receiving date and time and the number of a receiving public telephone and is stored in an abnormal item in the found IC card information memory 57. The found IC card is erased of the overall user information, dealt with such that the operation of the IC card is not permitted and recovered in the public telephone 1 to cope with IC card found processing.

Next, reception of found reward money will be described with reference to FIGS. 1, 2A–2B and 3A–3B. In the reception of reward money for the found processing, contact with the owner of the found IC card is first made after the center 7 completes identification of the owner based on the information read out of the found IC card and checking of the card transaction such as robbery or lost as described previously. Then, an amount of reward money offered by the owner of the found IC card (calculated on the basis of a guide line of a predetermined amount of money or prize money from the owner) and a fee of found processing charged by the center are confirmed. Based on this result, the amount of reward money is written into the reward ID code in question of the reward data memory 58 in the center 7.

Thereafter, the finder is identified by telephone and after the finder in question is identified, reception of the reward money is permitted. Accordingly, when the identification of the finder in question ends, access to the reward data memory 58 in the center 7 is acknowledged.

To start the reward receiving processing, the IC card found processing center calling button 4 is depressed in the public telephone 1 to cope with IC card found processing of FIG. 1. To describe a concrete operation, in the example of block construction of the public telephone 1 to cope with IC card found processing shown in FIGS. 2A–2B, an IC card found processing center calling signal is inputted from the keyboard 25 via the I/O port 23 and the public telephone 1 to cope with IC card found processing is brought into a found IC card processing mode by the system control circuit 22 and on the basis of data in the RAM (Random Access Memory) 20 and ROM (Read Only Memory) 24 in the processing circuit block 11 (step 66). At the same time, the I/O port 12 and the LCD control circuit 10 are controlled to display an indication "Please insert a found IC card or an electronic purse card" on the display 5 (step 67). Although not described specifically, the indication on the display 5 is also announced in the form of a voice through the medium of the receiver 65.

In accordance with this instruction, the electronic purse card 35 is inserted in the card insertion slot B 3 of FIG. 1. In the public telephone 1 to cope with IC card found processing, when an IC card loading/unloading circuit 33 and an actuation mechanism 32 confirm that the card is inserted, an ATR (Answer To Reset) operation is carried out through an IC card connector 29, a reader/writer circuit 27 and an I/O port 15 in order to check whether the inserted card is an electronic purse card and this operation is confirmed by the card check circuit 17.

Also, identification of the IC card is determined on the basis of ATR information (step 68).

When the card check circuit 17 confirms a complete inoperativeness such as no response to the ATR by the inserted IC card, an indication "This IC card malfunctions. The processing is stopped. Thank you" is displayed on the display 5 for a predetermined time (step 69). At the end of the predetermined time, the indication is switched to an indication "The processing ends" (step 70) and at the same time, the inserted IC card is ejected by means of the IC car loading/unloading circuit 33 and the actuation mechanism 32 (step 117).

After the operation of the inserted IC card is confirmed, identification of the inserted IC card is determined on the basis of the read-out ATR information and IC card identifying information in the ROM 24 (step 68).

When the result indicates that the IC card is an electronic purse card, an indication "The reward processing is started" is displayed on the display 5 (step 115).

Next, a reward ID code stored in a user area of the electronic purse card and the information specific to the IS electronic purse card are read by the data extraction circuit 21 (step 92) and communication with the reward payment processing center 7 is automatically carried out (auto-called) on the basis of information in the reward ID code through the communication function circuit 36 and the public telephone line by means of the auto-call circuit 19 (step 93). When the reward ID code is not stored in the user area of the electronic purse, an indication "This code has no reward ID code. The processing is suspended. Please take out the card" is displayed (step 122) and the card is ejected to end the processing. Upon completion of the auto-call, an indication "The center is being called" is displayed on the display 5 (step 94).

On the other hand, in the reward payment processing center 7, when the calling signal sent to the center 7 via the public telephone line is received through the communication function circuit 38 and the I/O port 41, the reward payment processing center 7 is switched into a reward processing mode by the system control circuit 54 on the basis of data in the RAM (Random Access Memory) 50 and the ROM 52 in the processing circuit block 40, and returns information "The reward processing is being received" to the originator of the public telephone 1 to cope with IC card found processing. Although not described specifically, the voice recognition/synthesis circuit 39 for response transmits to the public telephone 1 to cope with IC card found processing a voice output for response in voice together with the return signal.

In the public telephone 1 to cope with IC card found processing, an indication "The reward processing center is receiving" is displayed on the display 5 on the basis of the return signal (step 97). A response in the form of a voice is also made by means of the I/O port 13, the voice codec circuit 9 and the receiver 65.

Further, concurrently with receipt of the reward processing by the center 7, the reward ID code read out of the electronic purse card and the electronic purse specific information are sent to the center 7. In the center 7, a receiving data confirming circuit 48 confirms and checks the transmitted reward ID code and electronic purse specific information. The receiving data confirming circuit 48 checks the correspondence of data stored in the reward data memory 58 to the transmitted reward ID code and instructs an electronic purse card 63 in the center 7 to pay money data corresponding to an amount of reward money.

Thereafter, reward money from the electronic purse card 63, together with data indicative of the amount of reward money, is transmitted from the center 7 to the public telephone 1 to cope with IC card found processing. In the public telephone 1 to cope with IC card found processing, the amount of reward money is displayed (step 98) and the reward money is written into the electronic purse card 35 of the reward receiver (step 99). Upon completion of the write operation, a signal indicative of the receipt of reward money is transmitted to the center 7 and the reward ID code stored in the user area of the electronic purse card 63 is erased by means of the read/write control circuit 18 and reader/writer 27 (step 100).

When the erasing of the reward ID code ends,, an indication "Thank you" is displayed (step 101) and thereafter, an indication "The reward processing ends. Please take out the card" is displayed (step 102) and the electronic purse card is ejected (step 103).

In the above description of the reward processing, an instance where the public telephone 1 to cope with IC card found processing is utilized is explained but as far as a telephone has the IC card function such as an electronic purse when the center 7 identifies a person in question by telephone, the above reward processing as it is can be executed. In this case, a method based on the voice response is practicable without using the indication on the display as described in connection with the foregoing method based on the public telephone 1 to cope with IC card found processing.

Next, the processing for the owner of the found IC card will be described in brief. The owner of the found IC card is identified by means of a driver's license or a passport and thereafter, the information stored in the found IC card information memory 57 in the center 7 is returned to the owner through the communication line. In this case,, in the presence of money information, an 15 amount corresponding to the reward money and the found processing fee is subtracted and the remainder of money and the user information stored in the IC card are returned. In the absence of the money information or in the case where the money amount is insufficient, the owner is obliged to remit an amount of money corresponding to the reward money and the found processing fee to the center 7 through the communication line and thereafter the user information stored in the IC card is returned to the owner.

Another embodiment will be described with reference to FIGS. 1, 4A–4B and 5A–5B. In FIGS. 4A–4B and 5A–5B, components which function equally to those in FIGS. 2A–2B and 3A–3B are designated by the same reference numerals. In the present embodiment, an ID card such as a driver's license, a passport and a health insurance card can be used, in addition to the electronic purse card, in the found IC card processing.

Firstly, the processing when an IC card is found will be described. In order to start the processing of the found IC card, the IC card found processing center calling button 4 is depressed at the public telephone 1 to cope with IC card found processing of FIG. 1. To describe a concrete operation, in the example of block construction of the public telephone 1 to cope with IC card found processing shown in FIGS. 4A and 4B, an IC card found processing center calling button signal is inputted from a keyboard 25 via an I/O port 23 and the public telephone 1 to cope with IC card found processing is switched into a found IC processing mode by a system control circuit 22 and on the basis of data in a RAM (Random Access Memory) 20 and a ROM (Read Only Memory) 24 in a processing circuit block 11 (step 66). At the same time, an I/O port 12 and a LCD control circuit 10 are controlled to display an indication "Please insert a found IC card or an electronic purse card/ID card" on the display 5 (step 104). Although not described especially, the indication on the display 5 is also announced in the form of a voice through the medium of a receiver 65.

In accordance with this instruction, a found IC card 34 is inserted in the card insertion slot A 2 of FIG. 1. In the public telephone 1 to cope with IC card found processing, when an IC card loading/unloading circuit 31 and an actuation mechanism 30 confirm that the card is inserted, an ATR (Answer to Reset) operation is carried out through an IC card connector 28, a reader/writer circuit 26 and an I/O port 14 in order to identify and check whether the inserted card operates, the inserted card is an electronic purse card and the inserted card is an ID card having a reward ID code. This operation is confirmed by a card check circuit 17 and identification of the IC card is determined on the basis of ATR information (step 123).

When the card check circuit 17 confirms a complete inoperativeness such as no response to the ATR by the inserted IC card, an indication "This IC card malfunctions. The processing is stopped. Thank you" is displayed on the display 5 for a predetermined time (step 69). At the end of the predetermined time, the indication is switched to an indication "The processing ends" (step 70) and at the same time, the inserted IC card is effected by means of the IC card loading/unloading circuit 31 and the actuation mechanism 30 (step 117).

After the operation of the inserted IC card is confirmed, identification of the inserted IC card is determined on the basis of the read-out ATR information and IC card identifying information in the ROM 24 (step 123). When the result indicates that the IC card is not an electronic purse card or an ID card having no ID card, an indication "May the found IC card processing started? Please input YES (=1) or NO (=O)" is displayed on the display 5 (step 124). When "NO" (=O)" is inputted, the indication is changed to "The processing ends" (step 70) and the inserted IC card is effected by means of the IC card loading/unloading circuit 31 and the actuation mechanism 30 (step 117).

When "YES" is inputted, an indication "The found IC card processing is started" is displayed on the display 5 (step 116).

At the same time, information stored in the ATR and concerning a processing center to which the card belongs is read by a data extraction 21 (step 71) and communication with the center 7 is automatically carried out (auto-dialed) on the basis of the information through a communication function circuit 36 and the public telephone line by means of an auto-call circuit 19 (step 72). Upon completion of the auto-call, an indication "The center is being called" is displayed on the display 5.

On the other hand, in the IC card found processing center 7, when the calling signal sent to the center 7 via the public telephone line is received through a communication function circuit 38 and an I/O port 41, the IC card found processing center is switched into found IC processing mode by a system control circuit 54 and on the basis of data in a RAM (Random Access Memory) 50 and a ROM 52 in a processing circuit block 40 and returns information "The found processing is being received" to the originator or the public telephone 1 to cope with IC card found processing. Although not described especially, a voice recognition/synthesis circuit 39 for response transmits to the public telephone 1 to cope with IC card found processing a voice output for response in voice together with the return signal.

In the public telephone 1 to cope with IC card found processing, an indication "The found processing center is receiving" is displayed on the display 5 on the basis of the return signal (step 118). A response in the form of a voice is also made by means of an I/O port 13, a voice codec circuit 9 and the receiver 65. Further, following the signal return, the center 7 first transmits an instruction for reading information specific to a system of the found IC card such as an ID code, an issue place, an issue date and an issue version.

Responsive to the instruction, in the public telephone 1 to cope with IC card found processing, a read/write control circuit 18 in the processing circuit block 11 reads the information specific to the system from the inserted found IC card 34 through the IC card connector 28, reader/writer circuit 26 and I/O port 14. The read-out information is transmitted to the IC card found processing center 7 through the communication function circuit 36, public telephone line 37 and communication function circuit 38 without being stored in the public telephone 1 to cope with IC card found processing (step 74).

In the IC card found processing center 7, another computer (backyard computer 55) checks the read-out information and another database 64 in which data on, for example, stolen cards is stored by using a communication function 56. The result of the checking is compared with the system specific information read out of the found IC card by means of a card transaction check 51 (step 76). In addition, apart from the above found processing, the backyard computer 55 utilizes the communication function 56 and the different database 64 to access a database (wanted database) on which searching of missing IC cards is noticed so as to check whether the found IC card is involved or so as to specify an owner on the basis of the read-out IC card specific information. Thus, the specified IC card owner is informed that the IC card is found.

Concurrently with the checking, "The IC card is being checked" is returned to the public telephone 1 to cope with IC card found processing. In the public telephone 1 to cope with IC card found processing, an indication "The IC card is being checked" is displayed on the display 5 in response to the return signal (step 75).

Further, several access operations are carried out by an instruction based on data in the ROM 52 of the processing circuit block 40 in the center 7 to check security against an unauthorized duplication of the found IC card 34 and data alteration and the output result is transmitted to the center 7. Analysis of security check data is time-consuming and is therefore separated from the IC card found processing so as to be conducted by the backyard computer 55. The result of the security check is added to information of the found IC card to be described later and stored.

Upon completion of the IC card checking, the center 7 instructs the public telephone I to cope with IC card found processing to prepare for insertion of an ID card such as an electronic purse card, a driver's license or a passport in order to donate a reward for the found IC card processing. This is to check the confidence upon reception of reward money for the purpose of confirming the reward money receiver for preventing reward money exploitation due to an unfair practice. On the basis of this instruction, in the public telephone 1 to cope with IC card found processing, an indication "Please insert an electronic purse card" is displayed on the display 5 and at the same time, the public telephone 1 to cope with IC card found processing is switched into an electronic purse card receiving mode (step 77). In this phase, with an IC card inserted, it is checked whether the card is one having the electronic purse function (step 77) and when the card has no electronic purse function or when any card is not inserted during a predetermined time, an indication "Please insert a different ID card" is displayed on the display 5 and the public telephone 1 to cope with IC card found processing is switched into an ID card check mode (step 119).

When no card is inserted at step 119, an indication "The processing ends" is displayed (step 70) and at the same time, the inserted found IC card is ejected from the card insertion slot (step 117). Further, information that the found IC card processing is canceled on the way because no electronic purse card is inserted is transmitted to the center 7.

Receiving this transmitting signal, the center 7 adds the information to the effect that the processing ends on the way to the system specific information read out of the found IC card and the transaction check result of the found IC card and stores the resulting information in a found IC card memory 57 in the center 7 via an I/O port 44 (step 177).

In the case where an electronic purse card is inserted at step 77 or an ID card is inserted at step 119, system specific information such as an ID code, an issue place, an issue date, and an issue version is read out of the inserted card (step 105). The system specific information read out of this card is transmitted to the center 7 without being stored in the public telephone 1 to cope with IC card found processing. When receiving the card specific information, the center 7 sends an instruction asking the finder to inform a reward receivable data and to input a contactable telephone number necessary for identifying the person in question and for reading the overall user information in the found IC card. Receiving this instruction, the public telephone 1 to cope with IC card found processing displays an indication "Please input a contactable telephone number" on the display 5 and waits for inputting of the contactable telephone number (step 79). Then, with the contactable telephone number inputted, the inputted telephone number is displayed on the display 5 (step 84) and the overall user information in the found IC card is read (step 85).

The overall user information in the read-out found IC card is transmitted to the center 7 without being stored in the public telephone 1 to cope with IC card found processing. In the center 7, the overall user information in the found IC card is stored in the found IC card information memory 57 together with the information specific to the electronic purse card or ID card and the contactable telephone number information (step 109).

At the same time, a reward transaction check circuit 49 in the center 7 checks a reward payment transaction till then which is stored in a reward data memory 58 and the information specific to the electronic purse card or ID card presently transmitted to check whether the reward interval is abnormally short, in order to prevent an unfair practice aiming at acquisition of reward money.

If no abnormality is found in the check of the reward transaction, an IC code necessary for donating reward money to the IC card found processing is generated by a reward data generating circuit 47 (step 87).

Thus, the generated reward ID code is transmitted to the public telephone 1 to cope with IC card found processing and is written in a user area of the inserted electronic purse card 35 or ID card by means of the read/write control circuit 18 and reader/writer 27 (step 88). The reward ID code consists of the date, the found processing center code, the center telephone number, the reward processing ID number, the kind of the found processing IC card and the number of a public telephone which has received the found processing. The reasons why reward money for the found processing is not paid immediately but the reward ID code is written in the electronic purse or ID card are:

In order to prevent an unfair practice aiming at acquisition of reward money,

A) the finder himself or herself is checked,

B) reward is donated to the finder after an owner of the found card is found, and C) when no owner is found, the reward is donated by the found center after a predetermined time (for example, a year or half) has elapsed.

2. Since the found IC card is assumed to include various kinds of cards such as (a) a driver's license, (b) a health insurance card, (c) an electronic purse card and (d) a credit card and the owner has different degrees of necessities for recovering data, the reward for finding is determined at discretion of the owner.

When the writing of the reward ID code ends, an indication "Thank you. The found IC card is a . . . card (for example, an electronic purse card). A reward for finding will be informed to you by telephone after the owner is found. For reception of the reward, this electronic purse card is necessary" is displayed on the display 5 on the basis of information and an instruction from the center 7 in the case of the electronic purse card (step 89). At the end of a predetermined time, an indication "Please take out the electronic purse card. The found processing ends" is displayed (step 90) and the inserted electronic purse card is ejected (step 111). Concurrently therewith, the reward code is stored in the electronic purse reward data memory 121 (step 89). In the case of an ID card, the reward code is stored in the ID card reward data memory 120 (step 107).

Thereafter, an indication "Thank you. The found IC card is a . . . card (for example, an electronic purse card). A reward for finding will be informed to you by telephone after an owner is found. For reception of the reward, this ID card and the electronic purse card are necessary" is displayed on the display 5 on the basis of information and an instruction from the center 7 (step 108). At the end of a predetermined time, an indication "Please take out the electronic purse card. The found processing ends" is displayed (step 90) and the inserted electronic purse card is ejected (step 111).

On the other hand, the found IC card is erased of the overall user information, then dealt with such that the operation of the IC card is not permitted and recovered in the public telephone 1 to cope with IC card found processing.

Incidentally, when abnormality is recognized in the reward transaction check, an indication "The found processing is suspended. Please contact a processing suspend center (telephone number xxx-yyyy)" is displayed and the processing ends after ejecting the electronic purse card. Further, the information of the read-out found IC card is added with the information specific to the electronic purse card of which the abnormality is recognized, a flag indicative of the abnormality of reward transaction, the found processing receiving date and time and the number of a receiving public telephone and is stored in an abnormal item in the found IC card memory information memory 57. The found IC card is erased of the overall user information, dealt with such that the operation of the IC card is not permitted and recovered in the public telephone 1 to cope with IC card found processing.

Next, reception of found reward money will be described with reference to FIGS. 1, 4A–4B and 5A–5B.

In the reception of reward money for the found processing, contact with the owner of the found IC card is first made after the center 7 completes identification of the owner based on the information read out of the found IC card and checking of the card transaction such as robbery as described previously. Then, an amount of reward money offered by the owner of the found IC card (calculated on the basis of a guide line of a predetermined amount of money or prize money from the owner) and a fee of found processing charged by the center 7 are confirmed.

Based on the result, the amount of reward money is written into the reward ID codes in question of the reward data memories 120 and 121 in the center 7.

Thereafter, the finder is identified by telephone and after the finder in question is identified, reception of the reward money is permitted. Accordingly, when the identification of the finder in question ends, access to the reward data memories 120 and 121 in the center 7 are acknowledged.

To start the reward receiving processing, the IC card found processing center calling button 4 is depressed in the public telephone 1 to cope with IC card found processing of FIG. 1. To describe a concrete operation, in the example of block construction of the public telephone 1 to cope with IC card found processing shown in FIGS. 4A–4B, an IC card found processing center calling button signal is inputted from the keyboard 25 via the I/O port 23 and the public telephone 1 to cope with IC card found processing is switched into a found IC card processing mode by the system control circuit 22 and on the basis of data in the RAM (Random Access Memory) 20 and ROM (Read Only Memory) 24 in the processing circuit block 11 (step 66). At the same time, the I/O port 12 and the LCD control circuit 10 are controlled to display an indication "Please insert a found IC card or an electronic purse card/ID card" on the display 5 (step 104). Although not described specifically, the indication on the display 5 is also announced in the form of a voice through the receiver 65.

In accordance with this instruction, the found IC card 34 is inserted in the card insertion slot A 2 of FIG. 1. In the public telephone 1 to cope with IC card found processing, when the IC card loading/unloading circuit 31 and the actuation mechanism 30 confirm that the card is inserted, an ATR (Answer To Reset) operation is carried out through the IC card connector 28, the reader/writer circuit 26 and the I/O port 14 in order to check whether the inserted card is operative and whether the inserted card is an electronic purse card or an ID card having a reward ID code. This operation is confirmed by the card check circuit 17 and identification of the IC card is determined on the basis of ATR information (step 123).

When the card check circuit 17 confirms a complete inoperativeness such as no response to the ATR by the inserted IC card, an indication "This IC card malfunctions. The processing is stopped. Thank you" is displayed on the display 5 for a predetermined time (step 69). At the end of the predetermined time, the indication is switched to an indication "The processing ends" (step 70) and the inserted IC card is ejected by means of the IC card loading/unloading circuit 31 and the actuation mechanism 30 (step 117).

After the operation of the inserted IC card is confirmed, identification of the inserted IC card is determined on the basis of the read-out ATR information and IC card identifying information in the ROM 24 (step 123). When the result indicates that the inserted IC card is an electronic purse card or an ID card having the reward ID code, an indication "The reward processing is started" is displayed on the display 5 (step 115).

Next, the reward ID code stored in a user area and the information specific to the card are read by the extraction circuit 21 (step 112) and communication with the reward payment processing center 7 is automatically carried out (auto-called) on the basis of information in the reward ID code through the communication function circuit 36 and the public telephone line by means of the auto-call circuit 19 (step 93). When the result indicates that the IC card is not an electronic purse card or an ID card having no reward ID code, an indication "May the found IC card processing be started ? Please input YES (=1) or NO (=O)" is displayed on the display 5 (step 124). When "NO" is inputted, the indication is changed to "The processing ends" (step 70) and the inserted IC card is ejected by means of the IC card loading/unloading circuit 31 and the actuation mechanism 30 (step 117).

When "YES" is inputted, an indication "The found IC card processing is started" is displayed on the display 5 (step 116). The previously-described found processing is started. Upon completion of the auto-call, an indication "The center is being called" is displayed on the display 5 (step 94).

On the other hand, in the reward payment processing center 7, when the calling signal sent to the center 7 via the public telephone line is received through the communication function circuit 38 and the I/O port 41, the reward payment processing center 7 is switched into a reward processing mode by the system control circuit 54 on the basis of data in the RAM (Random Access Memory) 50 and the ROM 52 in the processing circuit block 40, and returns information "The reward processing is being received" to the originator or the public telephone 1 to cope with IC card found processing. Although not described especially, the voice recognition/synthesis circuit 39 for response transmits to the public telephone 1 to cope with IC card found processing a voice output for response in voice together with the return signal.

In the public telephone 1 to cope with IC card found processing, an indication "The reward processing center is receiving" is displayed on the display 5 on the basis of the return signal (step 97). A response in the form of a voice is also made by means of the I/O port 13, the voice codec circuit 9 and the receiver 65.

Further, concurrently with the receipt of the reward processing by the center 7, the reward ID code read out of the electronic purse card and the electronic purse specific information are transmitted to the center 7.

In the center 7, the receiving data confirming circuit 48 confirms and checks the transmitted reward ID code and electronic purse specific information. The receiving data confirming circuit 48 checks the correspondence of data stored in the reward data memory 58 to the transmitted reward ID code and instructs an electronic purse card 63 in the center 7 to pay money data corresponding to an amount of reward money.

Thereafter, reward money from the electronic purse card 63, together with data indicative of the amount of reward money, is transmitted from the center 7 to the public telephone 1 to cope with IC card found processing. In the public telephone 1 to cope with IC card found processing, the amount of reward money is displayed (step 98) and the reward money is written into the electronic purse card 35 of the reward receiver (step 99).

With the reward ID code written in the ID card, an instruction "Please insert an electronic purse card" from the center 7 is displayed on the display 5.

With the electronic purse card inserted in the other IC card insertion slot, the amount of reward money transmitted from the center 7 is displayed and the reward money from the electronic purse card 63 is written in the inserted electronic purse card (step 99).

Upon completion of write of the reward money, the reward ID code stored in the user area of the electronic purse card or ID card is erased by means of the read/write control circuit 18 and reader/writer 27 (step 100).

When the erasing of the reward ID code ends, an indication "Thank you" is displayed (step 101) and thereafter, an indication "The reward processing ends. Please take out the card" is displayed (step 102) and the electronic purse card is ejected (step 103). In the case of the ID card, the electronic purse card and the ID card are ejected (step 114). In the above description of the reward processing, an instance where the public telephone 1 to cope with IC card found processing is utilized is explained but as far as a telephone has the IC card function such as an electronic purse when the center 7 identifies a person in question by telephone, the above reward processing as it is can be executed. In this case, a method based on the voice response is practicable without using the indication on the display as described in connection with the foregoing method based on the public telephone 1 to cope with IC card found processing.

INDUSTRIAL APPLICABILITY

According to the present invention, by merely inserting a found IC card in, for example, a public telephone with the found processing function and depressing a found processing start button, information stored in the found IC card can easily be recovered without any burden on a card finder, an original IC card owner and a card issuing party and communication with and return of information to the owner can be also be ensured. Further, reward money can be donated suitably and easily to the finder of the IC card by electronic money by utilizing a communication line while preventing an unfair practice and therefore, a merit of improving the finding rate of IC cards can also be attained. In addition, since the IC card subject to the found processed is erased of information or is inoperative, an unauthorized use can be prevented even in the event that robbery occurs in a found processing terminal.

Consequently, security of the IC card can be maintained at a higher level and the cost of security maintenance in an IC card system can be reduced.

We claim:

1. An apparatus for processing a lost and found IC card having a microprocessor or a memory incorporated therein comprising:

a first card insertion slot for receiving insertion of the lost and found IC card;

a second card insertion slot for receiving insertion of a second IC card for receiving a reward for processing the lost and found IC card;

a key input unit containing a plurality of discrete keys that are independently operable by manual depression from a user to provide different unique input signals representing different control functions and alphanumeric symbols, including permitting the user to initiate processing of the lost and found IC card;

a display unit for providing a variable visual display of processing conditions for processing the lost and found IC card, and a processing unit for reading information from the lost and found IC card after the the user has initiated the processing of the lost and found IC card for calling an IC card lost and found processing center on the basis of the read-out information and for processing the reward via the second IC card.

2. An apparatus according to claim 1, further comprising:

a reader/writer for reading/writing information stored in the lost and found IC card; and a communication unit for establishing communication with the IC card processing center by using a telephone line.

3. An apparatus according to claim 1, further incorporated into an IC card system comprising said an IC card lost and found processing center which includes:

a first memory for storing information of the lost and found IC card transmitted from said processing unit of said apparatus;

a second memory for storing reward data; and a control unit for transmitting data indicating reception of the processing request of the lost and found IC card on the basis of a calling signal from said processing unit of said apparatus, for generating an instruction to invalidate operations of the lost and found IC card after storage of the information of the lost and found IC card, for generating reward data for the processing of the lost and found IC card, and for transmitting the reward data and the operation invalidating instruction to said processing unit of said apparatus.

4. An apparatus according to claim 1, wherein said processing unit processes information from the lost and found IC card by:

requesting insertion of the lost and found IC card into said first card insertion slot for processing an inserted IC card;

reading center information from the inserted IC card and automatically calling said IC card lost and found remote processing center for processing the inserted IC card;

reading system information from the inserted IC card, and transmitting the system information read from the inserted IC card to said IC card lost and found processing center to determine whether the inserted IC card corresponds to a lost IC card stored in a database;

when the inserted IC card is determined as the lost IC card, requesting insertion of an electronic purse card into said second card insertion slot for processing an inserted electronic purse card;

reading system information from the inserted electronic purse card, and transmitting the system information read from the inserted electronic purse card to said IC card lost and found processing center for reward; and receiving reward code from said IC card lost and found processing center for recording onto the inserted electronic purse card to reward an owner of the inserted electronic purse card who found the lost IC card.

5. An apparatus for processing a lost and found IC card having a microprocessor or a memory incorporated therein comprising:

a first card insertion slot for receiving insertion of a lost and found IC card;

a second card insertion slot for receiving insertion of a second IC card storing data of a reward for the processing of the lost and found IC card;

an key input unit containing a plurality of discrete keys that are independently operable by manual depression from a user to provide different unique input signals representing different control functions and alphanumeric symbols, including a center calling key for permitting the user to initiate processing of the lost and found IC card;

a display unit for providing a variable visual display of processing conditions for processing the lost and found IC card; and a processing unit for reading information from the lost and found IC card after the user has initiated the processing of the lost and found IC card, for calling an IC card lost and found processing center on the basis of the read-out information, and for enabling erasing the information of the lost and found IC card after the processing of the lost and found IC card ends.

6. An apparatus according to claim 5, further comprising a reader/writer for reading/writing information stored in the lost and found IC card; and a communication unit for establishing communication with the IC card processing center by using a telephone line.

7. An apparatus according to claim 5, further incorporated into an IC card system comprising said IC card lost and found center which includes:

means for transmitting data indicating reception of the processing request of the lost and found IC card on the basis of a calling signal from said processing unit of said apparatus;

means for storing information of the lost and found IC card transmitted from said processing unit on the basis of data indicating said reception;

means for generating the reward data for the processing of the lost and found IC card;

means for generating an instruction for erase of the information of the lost and found IC card after storage of the information of the lost and found IC card ends; and means for transmitting an instruction for erase of the reward data and the information of the lost and found IC card to said processing unit.

8. An apparatus according to claim 5, wherein said processing unit processes information from the lost and found IC card by:

when the inserted card is an electronic purse card, reading reward code from the inserted electronic purse card and automatically calling said IC card lost and found processing center for processing the inserted electronic purse card;

transmitting the reward code from the inserted electronic purse card to said IC card lost and found processing center; and receiving said discretionary amount of credit as reward money from said IC card lost and found processing center for recording onto the inserted electronic purse card so as to reward the owner of the inserted electronic purse card who found the lost IC card.

9. An apparatus according to claim 8, wherein said processing unit further comprising:

after said discretionary amount of credit is recorded onto the inserted electronic purse card, transmitting, at said terminal device, a signal indicating receipt of said credit to said remote processing center as record to avoid multiple rewards.

10. An IC card system comprising:

a terminal device; and a remote IC card processing center, said terminal device including:

a first card insertion slot for receiving insertion of a lost and found IC card;

a second card insertion slot for receiving insertion of a second IC card to receive reward data from said IC card processing center for processing the lost and found IC card, a key input unit containing a plurality of discrete keys that are independently operable by manual depression from a user to provide different unique input signals representing different control functions and alphanumeric symbols, including permitting the user to initiate processing of the lost found IC card;

a display unit for providing a variable visual display of processing conditions for processing the lost and found IC card; and a processing unit for reading information from the lost and found IC card after the user has initiated the processing of the lost and found IC card, for calling said remote IC card processing center on the basis of the read-out information, for transmitting/receiving IC card information to and from said remote IC card processing center, for writing reward data for the processing of the lost and found IC card from said remote IC card processing center into said second IC card, for invalidating operations of the lost and found IC card after the processing of the lost and found IC card ends, said remote IC card processing center including:

a first memory for storing information of the lost and found IC card transmitted from said terminal device;

a second memory for storing reward data; and a processing unit for transmitting data indicating reception of the processing request of the lost and found IC card on the basis of a calling signal from said terminal device, for generating an instruction to invalidate operations of the lost and found IC card after storage of the information of the lost and found IC card, for generating reward data for the processing of the lost and found IC card, and for transmitting the reward data and the operation invalidating instruction to said terminal device.

11. An IC card system according to claim 10, wherein said terminal device further comprises:
- a reader/writer for reading/writing information stored in the lost and found IC card; and
- a communication unit for establishing communication with the remote IC card processing center by using a telephone line.

12. An IC card system according to claim 10, wherein said processing unit of said terminal device comprises:
- a data extractor for extracting information from the lost and found IC card for communication with the IC card processing center;
- an auto-dialer for automatically dialing a designated number of the IC card processing center to establish communication therewith for processing the lost and found IC card; and
- a system controller for controlling different modes of operations of said terminal device for permitting the user to initiate and complete the processing of the lost and found IC card.

13. An IC card system comprising:
a terminal device; and
a remote IC card processing center,
said terminal device including:
- a first card insertion slot for receiving insertion of a lost and found IC card;
- a second card insertion slot for receiving insertion of a second IC card;
- a key input unit containing a plurality of discrete keys that are independently operable by manual depression from a user to provide different unique input signals representing different control functions and alphanumeric symbols, including permitting the user to initiate the processing of the lost and found IC card;
- a display unit for providing a variable visual display of processing conditions for processing the lost and found IC card; and
- means for reading information from the lost and found IC card after the user has initiated the processing of the lost and found IC card, for calling said remote IC card processing center on the basis of the read-out information, for transmitting/receiving IC card information to and from said remote IC card processing center, for writing the reward data for the processing of the lost and found IC card from said remote IC card processing center into said second IC card, for enabling erasing the lost and found IC card information on the basis of an instruction transmitted from said remote IC card processing center, said remote IC card processing center including:
- means for transmitting data indicating reception of the processing request of the lost and found IC card on the basis of a calling signal from said terminal device;
- means for storing information of the lost and found IC card transmitted from said terminal device on the basis of data indicating said reception;
- means for generating the reward data for the processing of the lost and found IC card;
- means for generating an instruction for erase of the information of the lost and found IC card after storage of the information of the lost and found IC card ends; and
- means for transmitting an instruction for erase of the reward data and the information of the lost and found IC card to said terminal device.

14. An IC card system according to claim 13, wherein said terminal device further comprises:
- a reader/writer for reading/writing information stored in the lost and found IC card; and
- a communication unit for establishing communication with the remote IC card processing center by using a telephone line.

15. An apparatus for processing IC card found in an IC card system having an IC card incorporating a microprocessor or a memory, means for reading/writing information stored in said IC card, and communication means for transmitting/receiving the information by using a telephone line, comprising:
a terminal unit; and
a found processing center,
said terminal unit including:
- receiving means for receiving a found IC card;
- receiving means for receiving a second IC card storing data of a reward for the found processing;
- processing start input means for starting the information found processing of the found IC card;
- means for reading information from said received found IC card after the processing start is inputted;
- means for calling said found processing center on the basis of the read-out information;
- means for transmitting/receiving the information of the found IC card on the basis of data of reception of the processing from said processing center;
- display means for displaying found processing conditions;
- means for transmitting information of said second IC card on the basis of an instruction transmitted from said processing center;
- means for writing the reward data for the found processing generated by said processing center into said second IC card; and
- means for invalidating the operation of said found IC card on the basis of an instruction transmitted from said processing center, said processing center including:
- means for transmitting data concerning reception of the found processing reception on the basis of a calling signal from said terminal unit;
- means for storing the information of the found IC card transmitted from said terminal unit on the basis of the data concerning the found processing reception;
- means for generating an instruction for reception of the information of said second IC card written with the found reward data;
- means for transmitting an instruction for reception of the information of the second IC card to said terminal unit;
- means for generating the reward data for the found processing on the basis of the information of said second IC card;
- means for storing said reward data and said second IC card information;
- means for transmitting said reward data to said terminal unit;
- means for generating an instruction for invalidating the operation of the found IC card for the found processing; and means for transmitting an instruction for invalidating said reward data and the operation of said received found IC card to said terminal unit.

16. A method for processing an IC card in an IC card system having a terminal device and a remote processing center operatively connected to said terminal device by way of a telephone line, comprising:

requesting, at a terminal device, insertion of an IC card into a first card insertion slot of said terminal device operatively connected to a remote processing center for processing an inserted IC card;

reading, at said terminal device, center information from the inserted IC card and automatically calling said remote processing center for processing the inserted IC card;

reading, at said terminal device system information from the inserted IC card, and transmitting the system information read from the inserted IC card to said remote processing center to determine whether the inserted IC card corresponds to a lost IC card stored in a database;

when the inserted IC card is determined as the lost IC card, requesting, at said terminal device, insertion of an electronic purse card into a second card insertion slot of said terminal device for processing an inserted electronic purse card;

reading, at said terminal device, system information from the inserted electronic purse card, and transmitting the system information read from the inserted electronic purse card to said remote processing center for reward; and receiving, at said terminal device, reward code from said remote processing center for recording onto the inserted electronic purse card to reward an owner of the inserted electronic purse card who found the lost IC card.

17. A method for processing an IC card in an IC card system having a terminal device and a remote processing center operatively connected to said terminal device, comprising:

determining whether a center calling key is depressed at a terminal device operatively connected to a remote processing center requesting for processing a lost card;

requesting, at said terminal device, insertion of a card into said terminal device;

determining whether an inserted card is one of an IC card and an electronic purse card;

when the inserted card is an IC card, reading, at said terminal device, center information from the inserted IC card, and automatically calling said remote processing center for processing the inserted IC card;

reading, at said terminal device, system information from the inserted IC card, and transmitting the system information read from the inserted IC card to said remote processing center to determine whether the inserted IC card corresponds to a lost IC card stored in a database;

when the inserted IC card is determined as the lost IC card, requesting, at said terminal device, insertion of an electronic purse card into said terminal device for processing an inserted electronic purse card;

reading, at said terminal device, system information from the inserted electronic purse card, and transmitting the system information read from the inserted electronic purse card to said remote processing center for reward; and receiving, at said terminal device reward code from said remote processing center for recording onto the inserted electronic purse card so as to reward an owner of the inserted electronic purse card who found the lost IC card a discretionary amount of credit.

18. A method according to claim 17, further comprising:

when the inserted card is an electronic purse card, reading, at said terminal device, reward code from the inserted electronic purse card and automatically calling said remote processing center for processing the inserted electronic purse card;

transmitting, at said terminal device, the reward code from the inserted electronic purse card to said remote processing center; and receiving, at said terminal device, said discretionary amount of credit as reward money from said remote processing center for recording onto the inserted electronic purse card so as to reward the owner of the inserted electronic purse card who found the lost IC card.

19. A method according to claim 18, further comprising:

after said discretionary amount of credit is recorded onto the inserted electronic purse card, transmitting, at said terminal device, a signal indicating receipt of said credit to said remote processing center as record to avoid multiple rewards.

\* \* \* \* \*